United States Patent
Dannenfeldt et al.

(10) Patent No.: US 12,292,012 B2
(45) Date of Patent: May 6, 2025

(54) OXIDATION PROTECTION LAYER FOR ENGINE PISTONS MADE OF STEEL OR AN IRON-BASED ALLOY

(71) Applicant: FEDERAL-MOGUL NURNBERG GMBH, Nuremberg (DE)

(72) Inventors: Margrit Dannenfeldt, Nuremberg (DE); Wolfram Cromme, Burgthann (DE); Jurgen Reitenspies, Altdorf bei Nurnberg (DE)

(73) Assignee: Federal-Mogul Numberg GmbH, Nuremberg (DE)

( * ) Notice: Subject to any disclaimer, the term of this patent is extended or adjusted under 35 U.S.C. 154(b) by 0 days.

(21) Appl. No.: 18/697,476

(22) PCT Filed: Sep. 21, 2022

(86) PCT No.: PCT/EP2022/076178
§ 371 (c)(1),
(2) Date: Mar. 31, 2024

(87) PCT Pub. No.: WO2023/052215
PCT Pub. Date: Apr. 6, 2023

(65) Prior Publication Data
US 2024/0401544 A1  Dec. 5, 2024

(30) Foreign Application Priority Data
Sep. 30, 2021 (DE) .................. 10 2021 210 995.0

(51) Int. Cl.
F02F 3/00 (2006.01)
C23C 24/08 (2006.01)
F02F 3/10 (2006.01)

(52) U.S. Cl.
CPC .............. *F02F 3/10* (2013.01); *C23C 24/085* (2013.01); *F02F 2200/00* (2013.01)

(58) Field of Classification Search
CPC ..... F02F 3/12; C09D 7/61; C09D 5/10; C23C 18/1216; C23C 4/02
USPC ........................................ 123/193.6
See application file for complete search history.

(56) References Cited

U.S. PATENT DOCUMENTS

| | | | | |
|---|---|---|---|---|
| 5,305,726 | A * | 4/1994 | Scharman | C23C 28/321 |
| | | | | 123/193.6 |
| 8,628,827 | B2 * | 1/2014 | Espinosa | C09D 5/106 |
| | | | | 106/14.44 |
| 10,487,773 | B2 * | 11/2019 | Taguchi | F01D 25/145 |
| 11,168,643 | B2 * | 11/2021 | Lineton | F02F 3/16 |
| 2008/0149897 | A1 | 6/2008 | Burkle | |
| 2009/0098289 | A1 | 4/2009 | Deininger et al. | |
| 2018/0179644 | A1* | 6/2018 | Koeberlein | C23C 4/11 |
| 2019/0107045 | A1* | 4/2019 | Durrett | B32B 9/048 |
| 2019/0352783 | A1* | 11/2019 | Roth | C09D 5/103 |
| 2020/0148893 | A1* | 5/2020 | Matzdorf | C08G 18/758 |

FOREIGN PATENT DOCUMENTS

EP  3455301 A1  3/2019

* cited by examiner

Primary Examiner — Long T Tran
Assistant Examiner — James J Kim
(74) Attorney, Agent, or Firm — Dickinson Wright PLLC

(57) ABSTRACT

A coating for reducing high-temperature oxidation of a piston for an internal combustion engine is provided. This coating is obtained by means of a composition containing titanate or zirconate, wherein at least one metal pigment is introduced into the coating.

12 Claims, 1 Drawing Sheet

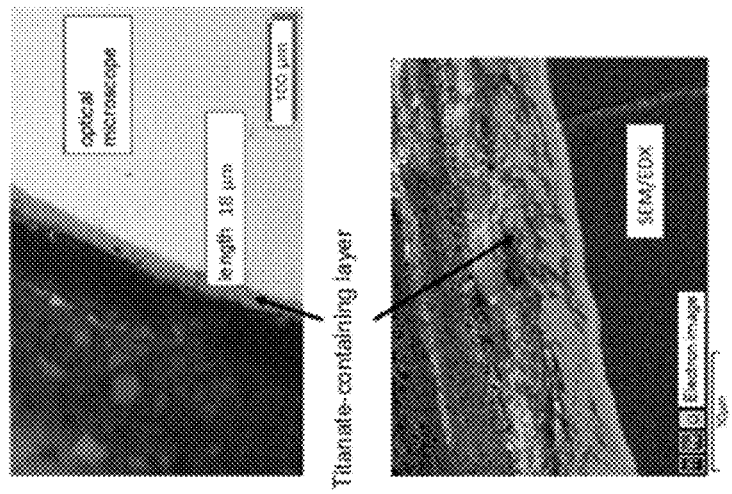
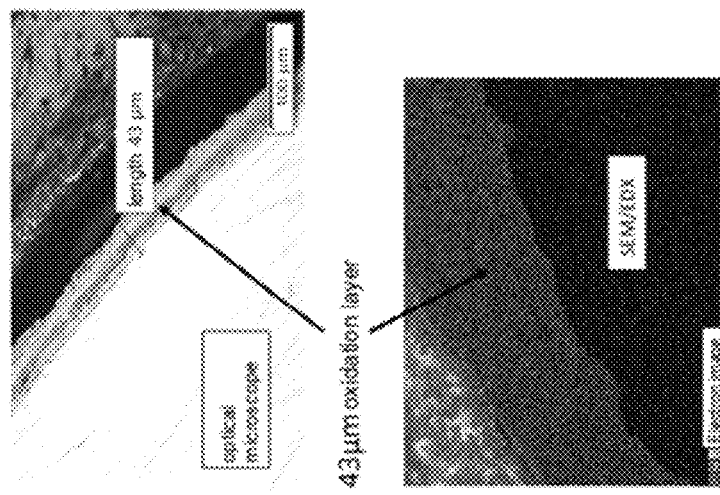

OXIDATION PROTECTION LAYER FOR ENGINE PISTONS MADE OF STEEL OR AN IRON-BASED ALLOY

BACKGROUND

Technical Field

The present invention relates to a coating for an engine piston made of steel or another iron-based alloy, which reduces or prevents oxidation or corrosion of the piston, where necessary.

Related Art

Steel pistons become much hotter in the motor than aluminum pistons owing to their lower heat conductivity. The consequence of this is that different reactions are triggered on the steel surface. Thus, for example, an oxide layer is formed on the rim of the combustion bowl in the piston crown, which can become detached and thereby lead to a reduction of the material layer thickness at this point. In the worst case, the piston thereby becomes cracked which leads to a material failure.

So far, the consequences of this oxidation can only be countered by measures that are expensive or disadvantageous for other reasons. One possibility is a reinforced dimensioning of the piston, which makes it heavier. However, a low piston weight is advantageous for LVD pistons, i.e. pistons for diesel motors in passenger cars or light commercial vehicles.

A different possibility for reducing the oxidation is the use of special alloys having a high chrome and nickel content. However, such alloys are expensive and make surface treatment, such as manganese phosphating, more difficult. The application of a galvanic protection layer or a ceramic spray layer is complex and associated with high costs.

US 8,6288,827 describes a coating for metal parts that is supposed to protect the surface from atmospheric corrosion at room temperature. The coating is obtained by applying a composition containing titanate or zirconate and curing. To give the coating a shiny appearance, a small amount of zinc, aluminum or zinc-aluminum alloy can be added to the composition. The use of this coating for pistons of internal combustion engines or other parts exposed to high temperatures of up to 550° C. is not disclosed.

There is therefore a need for a coating for pistons made of steel or another iron-based alloy that provides good oxidation protection and may also serve as corrosion protection, where necessary.

SUMMARY

Surprisingly, it has now been shown that the above problem can be solved by applying a layer to the piston, which can be obtained from a composition containing a titanate or a zirconate and which contains at least one metal pigment. In particular, it has been surprisingly shown that the cohesion of a layer obtained by means of a titanate or a zirconate can be improved if a metal pigment is added to this layer. In this way, a layer is obtained that is suitable for the piston of an internal combustion engine.

BRIEF DESCRIPTION OF THE FIGURES

FIG. 1 shows micrographs of a coated and an uncoated piston after an engine running test.

DETAILED DESCRIPTION

Consequently, a piston is provided, in particular a piston for an internal combustion engine, which is made of steel or another iron-based alloy, wherein a layer is applied onto at least a part of the piston, which layer can be obtained from a composition containing titanate or zirconate and contains at least one metal pigment. Furthermore, a method is provided for producing this layer and its use for preventing high-temperature oxidation or hot gas oxidation of the piston.

Within the scope, a layer that can be obtained from a composition containing titanate is preferred.

In the production of the layer, the titanate or zirconate contained in the composition is used as a precursor. A layer based on Ti—O or Zr—O units is formed by partial or complete dissociation of the organic residues.

This dissociation process can be initiated after the application of a suitable composition by exposure to moisture, including atmospheric moisture, or introduction of energy, for example by irradiation or heating. This dissociation process leads to curing of the layer.

Preferably, the layer that can be obtained from the composition containing titanate or zirconate contains 20 to 40% by weight of titanium oxide or 20 to 40% by weight of zirconium oxide, based on the entire layer, in the fully cured state. In this regard, the expression "in the fully cured state" relates to a layer obtained by application by means of a spray gun and subsequent heating in an oven at approximately 250° C. for 30 minutes.

The partial or complete dissociation of the organic residues causes the titanate or zirconate molecules to "shrink", so that the produced layer can exhibit cracks and pores. This leads to problems with the cohesion of the layer.

It has now been shown that cohesion is significantly improved if at least one metal pigment is added to the coating. In this way, a coating can be obtained that leads to improved protection of the piston against oxidation, so that the problem underlying the invention is solved.

A compound of the following general formula (I) is used as the titanate or zirconate:

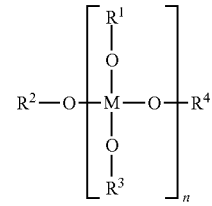

wherein R1, R2, R3 and R4 each independently represent H or an organic residue; preferably H, a phenyl group or a C1-C6 alkyl group; and particularly preferably a phenyl group or a C1-C4 alkyl group. R1, R2, R3 and R4 may optionally have substituents, but are preferably unsubstituted groups. M represents Ti or Zr, preferably Ti. n represents a natural number, preferably 1 to 4.

In a particularly advantageous embodiment, a titanate is used which is selected from the group consisting of tetramethyl titanate, tetraisopropyl titanate, tetrabutyl titanate and tetraphenyl titanate. The zirconate is preferably selected from the group consisting of tetramethyl zirconate, tetraisopropyl zirconate, tetrabutyl zirconate and tetraphenyl zirconate.

Within the scope, the titanates and zirconates can also be used in the form of chelate complexes.

The layer that can be obtained by means of the composition containing titanate or zirconate contains at least one metal pigment.

Alloys based on zinc, magnesium or aluminum are particularly suitable as metal pigments. Aluminum-magnesium and zinc-magnesium alloys are preferred.

Within the scope, the metal pigment is used, for example, in the form of a powder, preferably a powder with a particle diameter of 50 μm or less.

Preferably, the layer has a thickness in the range of 5 to 100 μm, more preferably 10 to 50 μm, in particular 10 to 30 μm.

The layer can also be part of a multilayer system. This means that other layers can be applied onto the piston in addition to the layer in order to influence different properties of the piston. These layers can be applied under or on top of the layer.

The layer is suitable for all steels and iron-based alloys that are conventionally used in pistons for internal combustion engines.

A piston with the layer can be manufactured by means of a method comprising the following steps:
 a) applying a composition comprising at least one titanate or zirconate of the general formula (I) onto the piston;
 b) applying at least one metal pigment onto the piston;
 c) partially or completely dissociating the titanate or zirconate; and
 d) curing the composition.

In the method, steps a) and b) can be carried out individually or together. Preferably, the composition containing titanate or zirconate and the metal pigment are applied together. Particularly preferably, the metal pigment is added to the composition containing titanate or zirconate before it is applied onto the piston. For this purpose, the metal pigment can be used in the form of a powder or a paste, for example.

Subsequently, the titanate or zirconate is dissociated as described and the layer is cured.

By using the layer, high-temperature oxidation or hot gas corrosion of the piston can be reduced.

Effect

A composition containing a titanate and a zinc-magnesium alloy pigment was applied by spraying onto a piston made of 42CrMo4. Subsequently, the composition was cured by heating in an oven at approximately 250° C. for 30 minutes.

The coated piston and an uncoated piston were subjected to an engine running test for 516 hours, wherein the engine was operated alternately for 30 minutes under full load and 2 minutes at idling speed.

Micrographs of the two pistons after completion of the test are shown in FIG. 1. As apparent from FIG. 1, an oxidation layer with a thickness of approximately 43 μm has formed on the uncoated piston. In contrast, high-temperature oxidation (hot gas corrosion) was prevented by the titanate-containing layer according to the exemplary embodiment.

The invention claimed is:

1. A piston for an internal combustion engine, which at least in part has a layer,
 wherein the layer is obtained from a composition comprising at least one titanate or zirconate of formula (I):

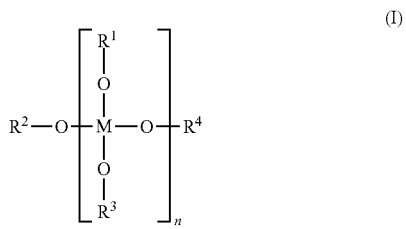

wherein R1, R2, R3 and R4 each independently represent H or a phenyl group; M represents Ti or Zr; and n represents an integer; and
 wherein the layer contains at least one metal pigment.

2. The piston according to claim 1, wherein the composition comprises the titanate.

3. The piston according to claim 1, wherein the at least one metal pigment is based on a zinc, magnesium or aluminum alloy.

4. The piston according to claim 1, wherein the layer is obtained by applying the composition, partially or completely dissociating the titanate or zirconate of the formula (I), and curing the composition.

5. An internal combustion engine comprising a piston according to claim 1.

6. The piston according to claim 2, wherein the titanate includes at least one of tetramethyl titanate, tetraisopropyl titanate, tetrabutyl titanate and tetraphenyl titanate.

7. The piston according to claim 3, wherein the at least one metal pigment is based on an aluminum-magnesium alloy or a zinc-magnesium alloy.

8. A method for manufacturing a piston, comprising the following steps:
 a) applying a composition comprising at least one titanate or zirconate of formula (I) onto the piston;

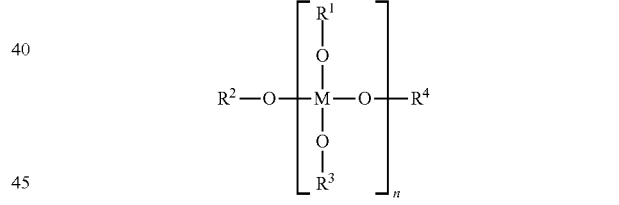

wherein R1, R2 R3 and R4 each independently represent H or a phenyl group; M represents Ti or Zr; and n represents an integer;
 b) applying at least one metal pigment onto the piston;
 c) partially or completely dissociating the titanate or zirconate; and
 d) curing the composition.

9. The method according to claim 8, wherein the dissociation of the titanate or the zirconate of the formula (I) is initiated by exposure to moisture, heating or irradiation.

10. The method according to claim 8, wherein the titanate or the zirconate and the metal pigment are obtained from the same composition.

11. The method according to claim 8, wherein in step b) the at least one metal pigment is based on a zinc, magnesium or aluminum alloy.

12. The method according to claim 11, wherein the at least one metal is based on an aluminum-magnesium alloy or a zinc-magnesium alloy.

* * * * *